United States Patent [19]

Okada et al.

[11] 4,034,993
[45] July 12, 1977

[54] SEALING APPARATUS

[75] Inventors: Masashi Okada; Takeshi Aoki, both of Okayama, Japan

[73] Assignee: Mitsui Shipbuilding and Engineering Co., Ltd., Tokyo, Japan

[21] Appl. No.: 633,212

[22] Filed: Nov. 19, 1975

[30] Foreign Application Priority Data

Nov. 27, 1974 Japan .......................... 49-144274

[51] Int. Cl.² .................................. F16J 15/24
[52] U.S. Cl. ........................ 277/188 A; 277/176; 285/113
[58] Field of Search .......... 277/188, 177, 176, 190, 277/29, 70, 167.5, 188 R, 188 A; 285/103

[56] References Cited

U.S. PATENT DOCUMENTS

| | | | |
|---|---|---|---|
| 2,614,793 | 10/1952 | Storm | 277/177 X |
| 3,329,447 | 7/1967 | Hitz | 285/113 |
| 3,716,245 | 2/1973 | Turolla | 277/70 |
| 3,833,227 | 9/1974 | Nillson | 277/176 |
| 3,927,891 | 12/1975 | Larker et al. | 277/70 |

*Primary Examiner*—Robert I. Smith
*Attorney, Agent, or Firm*—Howson and Howson

[57] ABSTRACT

Sealing apparatus used for sealing the gap between flanges which comprises an O-ring engaged with a circular groove formed in the coupling surface of one of the flanges and two backup rings engaged with the groove and the O-ring, each of the backup rings having an inclined surface to be axially urged by the O-ring whereby the upper backup ring is moved according to the gap to close it.

1 Claim, 6 Drawing Figures

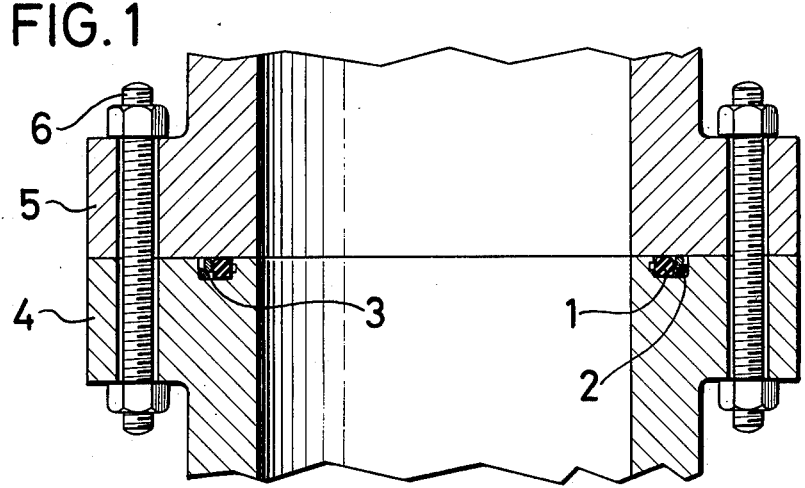
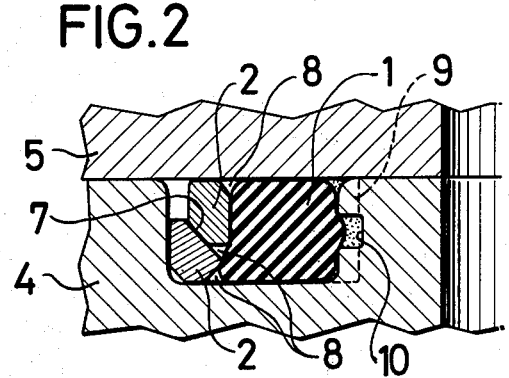 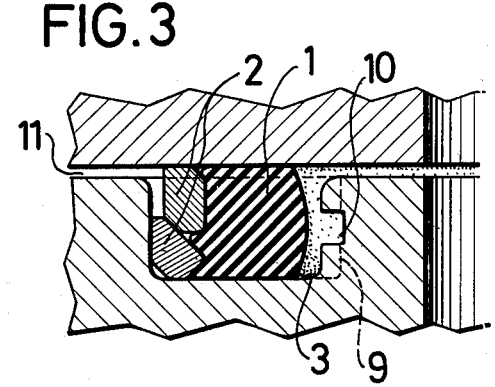
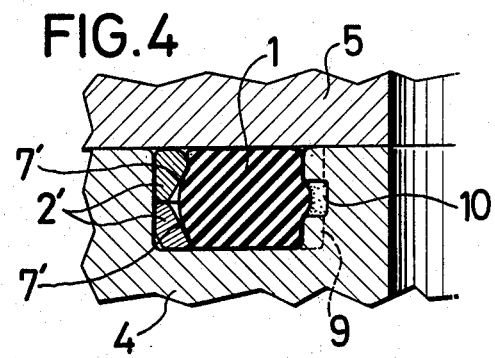 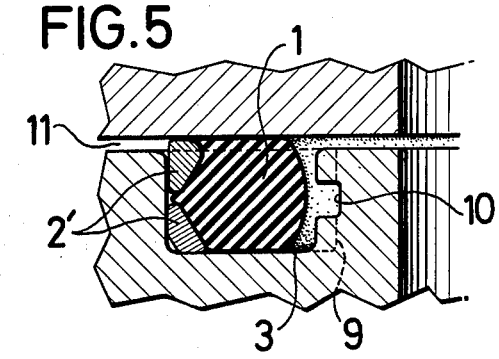
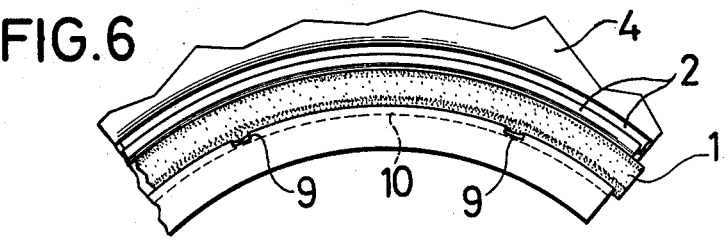

SEALING APPARATUS

The present invention relates to a sealing apparatus comprising a squeeze packing and more particularly to apparatus used for sealing a flange coupling. The conventional sealing apparatus comprises a circular groove formed in one of the flange of the flange coupling and a rubber O-ring engaged with the circular groove, the O-ring being pressed on the end surface of the other flange. If bolts connecting the flanges are extended or the flanges are deformed by high pressure fluid flowing in the conduits to form a gap between the flanges, the O-ring is forced out or expanded toward the gap. As a result, the apparatus does not serve as a sealing device under high pressure. In order to prevent such detrimental deformation, a backup ring made of teflon or metal has been used in the past to engage the O-ring in the groove. However, the arrangement using the backup ring is not sufficient for sealing the flange coupling under high pressure because of deformation of the backup ring or O-ring.

Therefore, an object of the present invention is to provide a sealing apparatus which can close the gap formed between the flanges to preventing the expansion of the O-ring toward the gap. In accordance with the present invention, the sealing apparatus comprises an O-ring engaged with a circular groove formed in the coupling surface of one of the flanges and two backup rings engaged with the groove and the O-ring at the atmosphere side. Each of the backup rings has an inclined surface to be axially urged by the O-ring to close the gap. Axial grooves in the radially-inward wall of the cylinder groove, preferably connected to each other by a circumferential grove, supply fluid pressure to the radially-inward side of the O-ring when the gap between the flanges opens, to urge the O-ring outward against the backup rings.

In the drawings:

FIG. 1 is a sectional view showing a sealing apparatus according to the present invention;

FIG. 2 is an enlarged sectional view showing a part of FIG. 1;

FIG. 3 is a sectional view showing a state in which a gap is formed between the flanges by extension of bolts;

FIGS. 4 and 5 are sectional views of another embodiment of the present invention; and FIG. 6 is a plan view showing a part of the sealing apparatus.

Referring to FIG. 1, the sealing apparatus according to the present invention comprises a rubber O-ring 1 and two backup rings 2 of metal which are engaged with the circular groove 3 formed in the coupling surface of flange 4. The flange 4 is coupled to the flange 5 by bolts 6. The backup rings are disposed adjacent the O-ring 1 at the atmosphere side. As shown in FIG. 2, both backup rings are engaged with each other at inclined surfaces 7 so that axial movement of the backup ring located in the upper position in the groove 3 may be permitted. Edges of each backup ring 2 adjacent the O-ring 1 are cut out to form three notches 8 with which one O-ring engages. On the side wall of the groove 3, a suitable number of balancing grooves 9 are axially formed and an O-ring engaging circular groove 10 is formed at the pressure side. Thus the O-ring 1 is squeezed by the flange 5 and backup rings 2 to engage with the notches 8 and groove 10.

When pressure of the fluid in the conduit is increased, a gap 11 is formed between the flanges 4 and 5 by extension of the bolts 6 and deformation of the flanges occurs as shown in FIG. 3. Therefor, the fluid flows into the groove 3 passing through the gap 11 and grooves 9 to act on the inner side of the O-ring. Accordingly, the O-ring 1 is urged outwardly by the fluid to press the backup rings 2, so that the upper side backup ring is moved radially and axially while sliding on the inclined surface 7 of the lower backup ring. The upper backup ring axially moves according to the gap to close it so that the radial expansion of the O-ring may be prevented. Thus the sealing effect of the O-ring may be kept in spite of the forming of the gap. Since the O-ring 1 is outwardly urged by the fluid, the engagement between the O-ring and the notches 8 is kept to ensure the sealing effect.

The sealing apparatus shown in FIGS. 4 and 5 has two backup rings 2' which are formed in approximately symmetrical shape. Both backup rings abut on the side wall of the groove 3 at the atmosphere side. Each backup ring has an inclined surface 7', whereby the upper and lower backup rings are upwardly and downwardly urged by the O-ring respectively. Thus when the gap 11 is formed between the flanges 4 and 5, the upper backup ring is axially moved according to the gap. Therefore, the sealing effect is ensured.

The seal of the invention is capable of providing any excellent sealing effect even at pressures of about 500 to 1,000 kg/cm²g, and even at seal diameters as large as 1 meter.

What is claimed is:

1. Flange sealing apparatus for sealing the gap between the confronting coupling surfaces of a pair of coupled flanges surrounding a fluid-containing pipe, comprising:

means defining a circular groove in the coupling surface of one of said flanges;

a resilient O-ring engaged in said groove and under compression between the bottom of said groove and the confronting coupling surface of the other of said flanges;

two backup rings engaged in said groove and engaging said O-ring on the atmosphere side thereof;

axially-extending grooves formed in the radially-inward side wall of said circular groove and extending from said confronting surface of said one flange to a position radially inward of said O-ring;

said sidewall containing a circumferential groove located radially inward of said O-ring connecting said axial grooves to each other;

said backup rings being positioned one above the other between the bottom of said groove and said confronting surface, and having inclined-plane surfaces such that the upper of said backup rings is urged upward against the confronting surface of the other of said flanges in responce to radially-outward pressure exerted by said O-ring;

whereby increased fluid pressure, supplied to the radially-inward side of said O-ring by way of said axially-extending grooves upon opening of the gap between said flange surfaces, causes said upper backup ring to move axially outward against said confronting surface of said other flange thereby to maintain backup of said O-ring.

* * * * *